Patented Apr. 27, 1926.

1,582,851

UNITED STATES PATENT OFFICE.

ALWIN MITTASCH AND WILHELM MICHAEL, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

EFFECTING CATALYTIC REACTIONS, PARTICULARLY IN CATALYTICALLY PRODUCING HYDROCYANIC ACID.

No Drawing. Application filed July 12, 1923. Serial No. 651,165.

*To all whom it may concern:*

Be it known that we, ALWIN MITTASCH and WILHEM MICHAEL, citizens of the German Empire, residing at Ludwigshafen-on-the-Rhine, Germany, have invented new and useful Improvements in Effecting Catalytic Reactions, Particularly in Catalytically Producing Hydrocyanic Acid, of which the following is a specification.

This invention relates to an improvement in effecting catalytic reactions, particularly in catalytically producing hydocyanic acid, and consists in the use of a distinct catalyst which has proved very suitable to favor the reaction desired and at the same time to repress obnoxious secondary reactions, both properties acting together in securing excellent yields of the desired product.

The catalyst employed according to this invention is microporous alumina in a particular form which is characterized by a vitreous surface and a transparent, clear or opaline body. This alumina which is distinctly different from the ordinary chalky form of alumina or from earthy alumina (such as bauxite), is obtained, for instance, by precipitating a solution of an aluminium salt with ammonia, washing and carefully drying the precipitate and heating it rapidly by which treatment the mass cracks into small grains in which form the substance may be directly used as a catalyst. Salts of other metals which can be precipitated by ammonia, may be added to the solution of the aluminium salt, or other metal hydroxids, or oxids to the aluminium hydroxid precipitated; as instances we mention thorium, zirconium and uranium salts or oxids. For the sake of simplicity, the term "alumina" whenever used in the following is to be understood as comprising also such mixtures with other oxids.

The catalysts thus obtained may also be mixed, for use, with other bodies, either inert or catalytically acting, for instance with grains of silicates.

The catalyst described is very adapted to effect the catalytic production of hydrocyanic acid by the interaction of carbon monoxid and ammonia. In carrying out this reaction with chalky alumina, not only a deposit of carbon is formed but as a rule a considerable loss of combined nitrogen by the formation of free nitrogen is observed. Both disadvantages are avoided by the use of the catalyst mentioned afore. A deposit of soot will not be observed even after a long use of the contact mass and the loss of combined nitrogen is very small.

The invention will be illustrated by exact examples but it should be understood that the invention is not confined to these examples.

In order to make the catalyst mentioned, we proceed, for example, in the following manner. Aluminium nitrate is dissolved in six times its weight of water and a current of ammonia gas is then introduced until unabsorbed ammonia begins freely to escape; aluminium hydroxid is precipitated and the liquid is growing hot nearly to boiling point. The precipitate is then filtered off and washed while on the filter without completely removing the salts so as to avoid the formation of a suspension and carefully dried while slowly raising the temperature above 100 degrees centigrade. The mass which has fallen into pieces is then quickly heated to red heat and thereby cracks into smaller, sharply edged grains which show a vitreous shining surface of fracture. Generally, the product is more or less opaline, but in any case it is transparent. Both the transparency and the vitreous surface appear at least under a microscope with thin pieces of the product. It is microporous and capable of absorbing liquids and highly adhesive to the tongue and under a microscope in polarized light it shows distinct double refraction.

For the production of hydrocyanic acid from carbon monoxid and ammonia, the contact mass so obtained is brought into a tube which is heated to from 500 degrees to 700 degrees centigrade while a mixture of equal volumes of ammonia and carbon monoxid is passed through. Hydrocyanic acid is formed in ample quantities; it may be recovered from the reaction gases by a passage through alkali lye or the like. The reaction may be carried out with other proportions of ammonia and carbon monoxid, and other gases, such as hydrogen or nitrogen may also be present.

We claim:

1. The process of producing hydrocyanic acid catalytically which is characterized by the use, as a contact mass, of microporous grains of alumina having a vitreous surface and a transparent body.

2. The process of producing hydrocyanic acid catalytically which is characterized by passing carbon monoxid and ammonia over a contact mass consisting of microporous grains of alumina with a vitreous character.

In testimony whereof we have hereunto set our hands.

ALWIN MITTASCH.
WILHELM MICHAEL.